United States Patent
Oakes, III et al.

(10) Patent No.: US 9,477,978 B1
(45) Date of Patent: Oct. 25, 2016

(54) SYSTEMS AND METHODS FOR A VIRTUAL CAR ADVISOR

(75) Inventors: Charles Lee Oakes, III, Boerne, TX (US); Reynaldo Medina, III, San Antonio, TX (US)

(73) Assignee: UNITED SERVICES AUTOMOBILE ASSOCIATION, San Antonio, TX (US)

( * ) Notice: Subject to any disclaimer, the term of this patent is extended or adjusted under 35 U.S.C. 154(b) by 568 days.

(21) Appl. No.: 12/062,593

(22) Filed: Apr. 4, 2008

(51) Int. Cl.
*G06F 17/30* (2006.01)
*G06Q 30/06* (2012.01)

(52) U.S. Cl.
CPC ..... *G06Q 30/0613* (2013.01); *G06F 17/30253* (2013.01); *G06Q 30/0623* (2013.01)

(58) Field of Classification Search
USPC .......................................................... 707/769
See application file for complete search history.

(56) References Cited

U.S. PATENT DOCUMENTS

| | | | | |
|---|---|---|---|---|
| 4,455,759 A * | 6/1984 | Coetsier | ........................ | 33/288 |
| 4,939,848 A * | 7/1990 | Armstrong | ..................... | 33/608 |
| 5,535,522 A * | 7/1996 | Jackson | ........................ | 33/288 |
| 5,931,878 A | 8/1999 | Chapin, Jr. | ..................... | 701/30 |
| 5,950,169 A * | 9/1999 | Borghesi et al. | ................. | 705/4 |
| 5,995,961 A * | 11/1999 | Levy et al. | | |
| 6,055,860 A * | 5/2000 | Pfanstiehl | ...................... | 73/600 |
| 6,535,802 B1 | 3/2003 | Kramer | ......................... | 701/29 |
| 6,594,557 B1 | 7/2003 | Stefan et al. | | |
| 6,772,145 B2 | 8/2004 | Shishido | .......................... | 707/3 |
| 7,184,974 B2 | 2/2007 | Shishido | ......................... | 705/26 |
| 7,680,324 B2 * | 3/2010 | Boncyk et al. | .............. | 382/165 |
| 7,889,931 B2 * | 2/2011 | Webb et al. | ................. | 382/209 |
| 2002/0055861 A1 | 5/2002 | King et al. | | |
| 2002/0099483 A1 * | 7/2002 | Jackson et al. | ................. | 701/29 |
| 2002/0116228 A1 * | 8/2002 | Bauer et al. | ...................... | 705/4 |
| 2002/0188484 A1 * | 12/2002 | Grover et al. | .................... | 705/4 |
| 2003/0014295 A1 * | 1/2003 | Brookes et al. | .................. | 705/9 |
| 2003/0043272 A1 * | 3/2003 | Nagao et al. | ............. | 348/207.1 |
| 2004/0119876 A1 * | 6/2004 | Ohmori et al. | .............. | 348/362 |
| 2004/0199785 A1 * | 10/2004 | Pederson | ...................... | 713/200 |
| 2005/0251427 A1 * | 11/2005 | Dorai et al. | ...................... | 705/4 |
| 2006/0002607 A1 * | 1/2006 | Boncyk et al. | .............. | 382/165 |
| 2006/0155614 A1 * | 7/2006 | Woytowick et al. | ........... | 705/27 |
| 2006/0178793 A1 * | 8/2006 | Hecklinger | ..................... | 701/35 |
| 2006/0216017 A1 * | 9/2006 | Ono et al. | ..................... | 396/281 |
| 2007/0143195 A1 * | 6/2007 | Bell et al. | ....................... | 705/35 |
| 2008/0071645 A1 * | 3/2008 | Latsoudis | ........... | G06Q 10/107 705/14.73 |
| 2009/0138290 A1 * | 5/2009 | Holden | ............................ | 705/4 |
| 2009/0237546 A1 * | 9/2009 | Bloebaum et al. | ...... | 348/333.01 |

OTHER PUBLICATIONS

Consumer Reports Issues First Top 10 List of Used Cars, May 20, 1995, pp. 1-7.*
MsMoney.com, 2006, pp. 1-10.*
Yahoo Answers Singapore, 2007, pp. 1-3.*

(Continued)

*Primary Examiner* — Albert Phillips, III
(74) *Attorney, Agent, or Firm* — Baker & Hostetler LLP

(57) ABSTRACT

A system for advising a user on the condition of a vehicle is described. Data can be collected from a vehicle in the form of images or reflected energy from a section or part of the vehicle, and the data can be analyzed to determine if repairs, damage, or other problems are present. The collected data may also be images of identifying panels or insignia on the car. A report with results of the analysis can be provided to the user. The results of the analysis may describe detected damage or repairs, provide vehicle history or identifying information, or report detection of repainting.

23 Claims, 4 Drawing Sheets

(56) References Cited

OTHER PUBLICATIONS

Accurate Auto Appraisers, 2001, pp. 1-6.*
Lomax, Coating Thickness Measurement:The Fundamentals, 2006, 4 pages.*
Passwater, Suspension Damage Diagnosis & Estimating, Sep. 1, 2007, 5 pages.*
Farrell, Electronic Paint Thickness Gauges What They Are, and Why You Need Them, Feb. 2008, 5 pages.*
"Car Data Check" [Retrieved on Feb. 16, 2008] Retrieved from the internet <http://www.ukvehiclecheck.com>.

* cited by examiner

SYSTEMS AND METHODS FOR A VIRTUAL CAR ADVISOR

CROSS-REFERENCE TO RELATED APPLICATIONS

This application is related by subject matter to the subject matter disclosed in the following commonly assigned applications, the entirety of which are hereby incorporated by reference herein: U.S. patent application Ser. No. 12/062,574, and U.S. patent application Ser. No. 12/062,615, each filed on Apr. 4, 2008 and each entitled "Systems and Methods for a Virtual Car Advisor."

BACKGROUND

Purchasing a vehicle can be a daunting task, especially if the purchaser has little or no knowledge of automobile maintenance and repair and is looking to purchase a used vehicle. This is more common today, as more drivers use car dealers and professional mechanics to keep their vehicles in good repair rather than working on them personally. Many mechanical problems or previous repairs are very difficult to detect with the untrained eye. Some problems are almost impossible to detect without the use of sophisticated equipment. Undetected problems can result in expensive trips to the mechanic for the purchaser. Too many repairs may indicate poor treatment of a vehicle by the seller. Previous repairs may also have been performed inadequately, leaving the purchaser with hidden problems that may be expensive to fix. Thus, there is a greater need today to assist the average car purchaser in determining whether a car is in good repair and a good candidate for their purchase.

SUMMARY

Systems and methods are provided for a virtual car advisor system. In one non-limiting example, information may be obtained about a vehicle by analyzing data collected from the vehicle using a mobile device. An image of a section of the vehicle may be received from a user, analyzed, and a determination made as to whether a condition is present based on the image. In this way, problems or defects in the vehicle and past repairs may be detected. A response may then be sent to the user. The response may be provided via a mobile device operated by the user.

In another non-limiting example, energy may be emitted onto a vehicle using a mobile device or an attached component, and the reflected energy may be detected and measured. An analysis may be performed on the measurements. The analysis may include comparisons of measurements of reflected energy from different sections of the vehicle body. Differences in such measurements may indicate that a section has been repainted. The results of the analysis may then be reported to the user. Such results may be transmitted to the mobile device operated by the user.

In yet another non-limiting example, image data of a section of a vehicle containing identifying information associated with vehicle may be captured using a mobile device. The image data may be analyzed to derive the identifying information, which may then be used to obtain a history or other relevant information pertaining to the vehicle. The results of this analysis may then be reported to the user, and may be transmitted to a mobile device operated by the user.

BRIEF DESCRIPTION OF THE DRAWINGS

The foregoing summary and the following detailed description of preferred embodiments are better understood when read in conjunction with the appended drawings. For the purposes of illustration, there is shown in the drawings exemplary embodiments; however, the subject matter is not limited to the specific methods and instrumentalities disclosed. In the drawings.

DETAILED DESCRIPTION

The subject matter of the described embodiments is described with specificity to meet statutory requirements. However, the description itself is not intended to limit the scope of this patent. Rather, it is contemplated that the claimed subject matter might also be embodied in other ways, to include different steps or elements similar to the ones described in this document, in conjunction with other present or future technologies.

Figure 1:
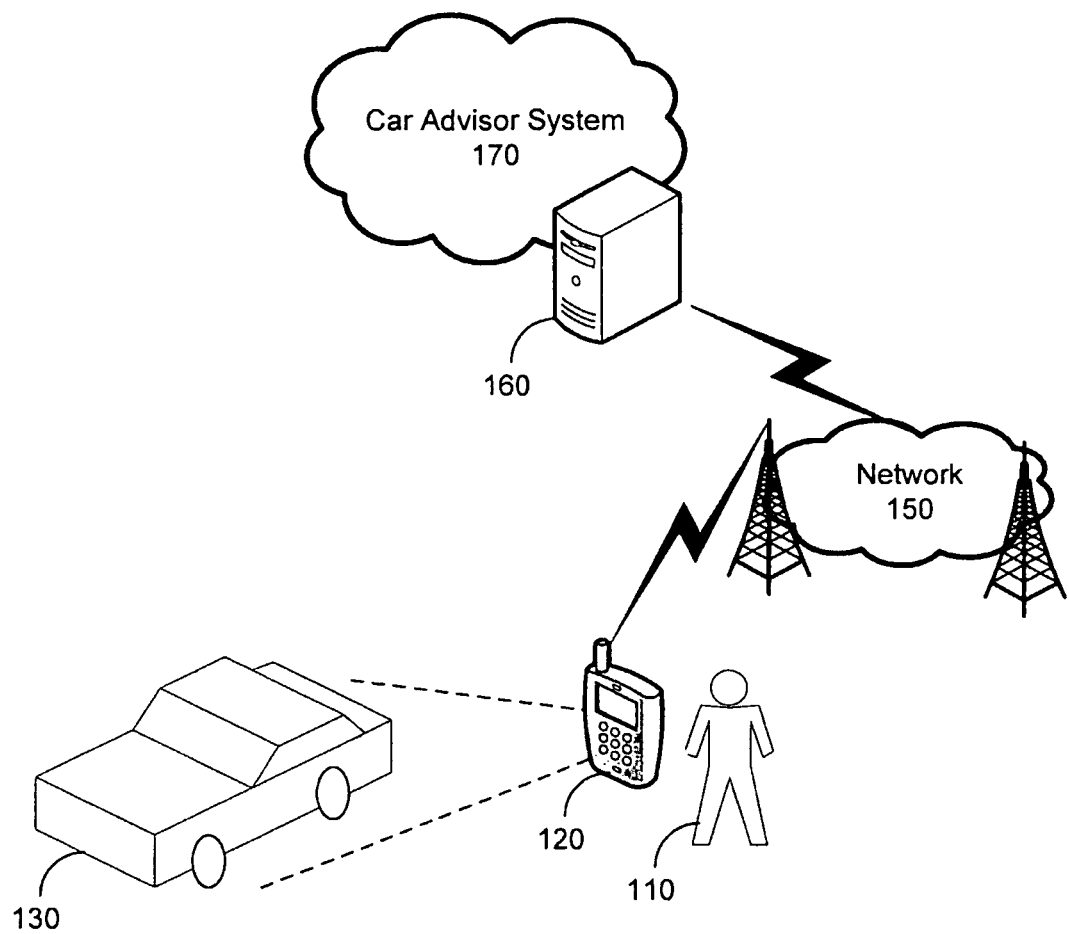
FIG. 1 is a graphical representation of an exemplary, non-limiting virtual car advisor system.

When evaluating a vehicle for possible purchase, a buyer will want to know as much about the condition of the car as possible. This is not usually a problem for new cars, but it is often a concern with used cars. However, it can be difficult for an untrained buyer, or even an experienced mechanic, to identify all potential problems with a car. In one embodiment, a system is provided that enables a vehicle purchaser to receive assistance via a mobile device in evaluating a vehicle. FIG. 1 illustrates a non-limiting diagram of an exemplary system for advising a purchaser on the condition of a vehicle.

Purchaser 110 is operating mobile device 120. Purchaser 110 may be any person who is interested in purchasing a vehicle, or anyone who merely wants to assess the condition of any vehicle. Mobile device 120 may be any device that is capable of operating on a wireless mobile communications network and that communicates with other devices using, at least in part, a wireless network. Examples of such devices include, but are not limited to, mobile telephones, mobile computers, personal data assistants ("PDAs"), navigation systems, vehicle communication systems, and wirelessly networked computers. Any device that can communicate with any other device by communicating, at least in part, wirelessly through a wireless network is contemplated as being within the scope of the present disclosure.

Mobile device 120 may include global positioning system ("GPS") components and/or software, enabling it to communicate with GPS satellites and determine its own location, speed, direction, and the current time. Mobile device 120 may be constructed such that it can communicate GPS-derived location and direction information to a telecommunications network, other devices, and/or purchaser 110. Mobile device 120 may include other means of determining its own location, speed, and/or direction, including receiving such information from a telecommunications network, or deriving such information from the use of technologies well known to those skilled in the art that use one or more cellular towers and analysis of signal strength, time delays, angles of arrival, or other measurements to determine a device's location. Such locating means include, but are not limited to, triangulation and hyperbolic fixing schemes. Such locating means may use time delays between mobile device 120 and two or more cellular towers to determine a relatively precise location for mobile device 120. The various means and methods of locating a device using cellular network measurements, including the use of time delay and/or signal strength to determine the location, speed, and/or direction of a mobile device, are well known to those skilled in the art, and therefore will not be recited herein. Any means of determining a mobile device's current or past location, speed, and/or direction are contemplated as within the scope of the present disclosure.

Mobile device 120 is serviced, at least in part, by network 150. Network 150 may be any network that facilitates wireless communications, may also include wired communication capabilities, and may communicate with other wired and wireless networks. Any and all such networks are contemplated as within the present disclosure. Examples of such networks include telephony radio networks such as global system for mobile communication ("GSM") networks and code division multiple access ("CDMA") networks, wireless computer networks such as Wi-Fi and IEEE 802.11 networks, and wired networks such as local area networks ("LANs"), wide area networks ("WANs"), intranets, and the Internet. Network 150 represents any possible combination of such networks, including a wireless network that may connect to the Internet and communicate with other devices that are connected, directly or indirectly, to the Internet. An example of such a device is server 160, which is part of car advisor system 170 and capable of communicating with mobile device 120 over network 150.

Purchaser 110 in FIG. 1 may be evaluating vehicle 130. Vehicle 130 may be any vehicle that is capable of transporting passengers, including, but not limited to, a car, a truck, a van, a minivan, a sport-utility vehicle, a motorcycle, a scooter, a recreational vehicle, a boat, or a tractor.

Purchaser 110 may use mobile device 120 to acquire data about vehicle 130. Acquiring vehicle data may be performed using any component of mobile device 120 capable of acquiring data. In one exemplary embodiment, purchaser 110 activates a camera component of mobile device 120 to acquire one or more images of a section of vehicle 130. In another embodiment, purchaser 110 activates a camera separate from mobile device 120, which is communicatively connected to mobile device 120. Mobile device 120 may then receive images from such a camera for manipulation and/or communication to other devices or systems. As will be discussed in further detail herein, the images may then be sent to an analysis device, such as server 160, or they may be analyzed on mobile device 120 or a cooperating component, and a response may be provided to purchaser 110 through mobile device 120.

In another embodiment, purchaser 110 may require assistance in acquiring data. This may be because precise data may be needed to determine certain conditions of vehicle 130. Purchaser 110 may activate an input or otherwise request assistance from car advisor system 170, for example, by operating mobile device 120 to send a transmission to server 160. Car advisor system 170 may then remotely control mobile device 120, or a component contained therein, to acquire data from vehicle 130. For example, purchaser 110 may hold mobile device 120, while a representative of car advisor system 170 remotely controls a camera component of mobile device 120 to obtain images of vehicle 130. The assistance from car advisor system 170 may be completely automated or it may involve human participation.

In one embodiment, purchaser 110 operates mobile device 120 to acquire images of the tires and/or wheels of vehicle 130. Purchaser 110 may use mobile device 120 to acquire one image of both sides of the car. Purchaser 110 may also acquire images of the front and the back of the car. Mobile device 120 may contain or be configured with an application, or may communicate with a remote application hosted on another device, such as server 160, that provides instruction to purchaser 110 about the manner in which images are to be obtained. Such instruction may be based on the analysis that will be performed on the images. For example, instructions may be provided to purchaser 110 to acquire an image with mobile device 120 being a specified distance away from the driver's side of the car and at a specified height. Such instructions may assist in properly evaluating the images acquired. Alternatively, purchaser 110 may request assistance from car advisor system 170, for example by sending a transmission to server 160 from mobile device 120. Car advisor system 170 may then remotely control the camera component of mobile device 120 to acquire images of the tires and/or wheels of vehicle 130.

In one non-limiting example, images taken of the wheels of vehicle 130 from the sides of vehicle 130 are acquired using mobile device 120 for analysis of vehicle frame alignment. The images may be transmitted from mobile device 120 to server 160 for analysis by car advisor system 170 over network 150. Alternatively, mobile device 120 may perform the analysis. Server 160, other component within car advisor system 170, or mobile device 120 may analyze, or cause to be analyzed through direction to other devices, the acquired images to determine if there are any differences between the spacing between wheels on either side of vehicle 130, or any other indications in the images that a problem may exist. For example, if the distance between the centers of the front and rear wheels on the driver's side of vehicle 130 is different than the distance between the centers of the front and rear wheels on the passenger's side of vehicle 130, it may be because of frame damage or some other problem with vehicle 130. Such a difference in distance may be difficult to detect with the naked eye, but may indicate a potential for expensive repairs and future problems with vehicle 130.

In another non-limiting example, images may be acquired of the wheels and tires of vehicle 130 from the front and/or back of vehicle 130. These images may be transmitted to server 160 for analysis by car advisor system 170, or they may be analyzed by mobile device 120. For example, measurements of the angle and position of the wheels may be used to determine if the wheels are properly aligned. Alternatively, images of the tires may be analyzed to determine if the tread wear patterns are uneven, which may indicate alignment problems, lax tire maintenance, or other issues. The results of such an analysis may provide insight as to whether vehicle 130 was properly maintained by previous owners. Any other analysis of tires or wheels that may provide insight into the condition of vehicle 130 is contemplated as within the scope of the present disclosure.

In yet another non-limiting embodiment, one or more images of body panels of vehicle 130 are captured and analyzed. For example, gaps between body panels may indicate a previous repair, perhaps after an accident, or poor assembly of vehicle 130. Alternatively, improper alignment of body panels with one another may indicate past repairs or other problems. Any other image or images of sections, parts, components, or any other portion of vehicle 130, or images of vehicle 130 as a whole, may be used for analysis of vehicle 130 to determine if there are problems with vehicle 130. All such images are contemplated as within the scope of the present disclosure.

In one embodiment, data may be collected using a component on or attached to mobile device 120 that may emit a form of energy onto an object and detect the energy reflected back from the object. Such a component may be separate from mobile device 120 and communicatively connected to mobile device 120 such that it can transmit data to mobile device 120 for manipulation and/or communication to another device and/or system. The energy emitted may be any type of energy that may be useful in evaluating the condition of an vehicle, including, but not limited to, sound waves, ultrasonic energy, electromagnetic radiation of all types, such as visible light, radio waves, microwaves, terahertz radiation, infrared radiation, visible light, ultraviolet radiation, X-rays and gamma rays. Likewise, the detected reflected energy may be of any type useful in evaluating the condition of a vehicle, including, but not limited to, the electromagnetic radiation types listed herein. Any energy that may provide a means of evaluating a vehicle is contemplated as within the scope of the present disclosure.

In another embodiment, energy may be emitted onto an object of varying types or strengths. For example, several wavelengths of electromagnetic energy may emitted onto on object. Then, the reflected energy may be detected and analyzed to determine if all or certain wavelengths are reflected back. By analyzing the composition of the reflected energy and comparing it to the emitted energy, it may be determined that certain characteristics of the object are present. For example, paint thicknesses may be determined, or the presence of repair materials may be determined. Known characteristics of original materials may be compared to the collected data, and determinations may be made based on the comparison. Any other method or means of emitting energy of any form and measuring reflected energy to determine characteristics of an object or material are contemplated as within the scope of the present disclosure.

Figure 2:
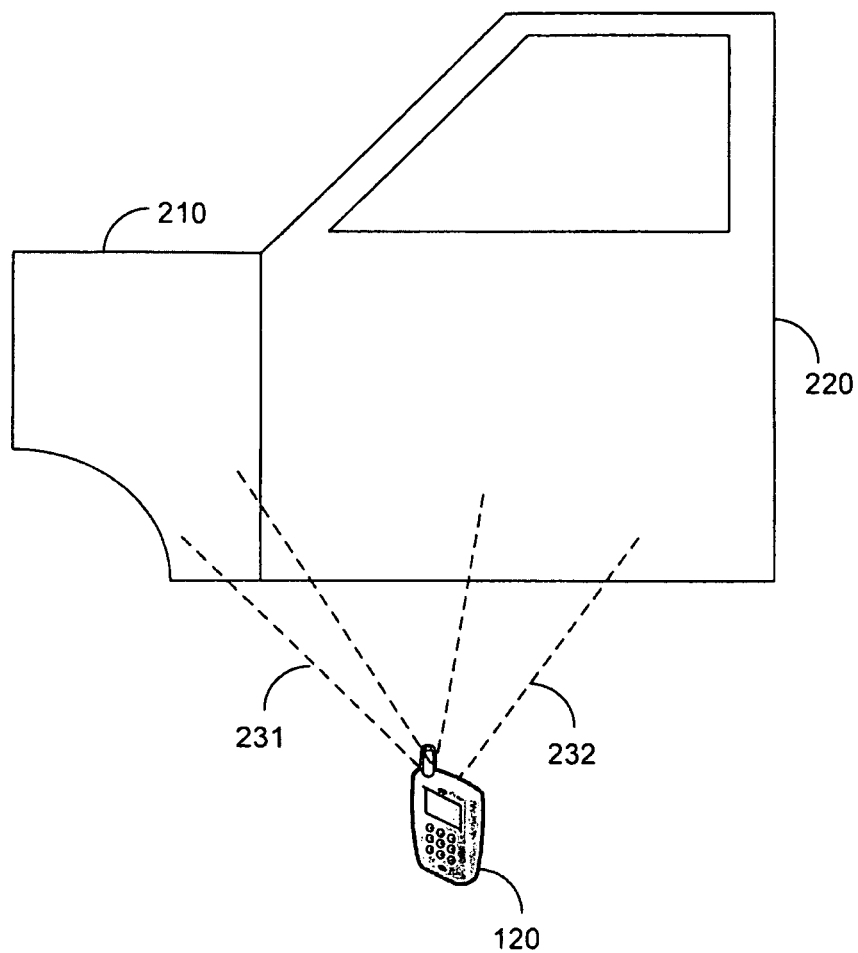
FIG. 2 is a graphical representation of an exemplary, non-limiting mobile device in use as a component in a virtual car advisor system.

FIG. 2 illustrates a non-limiting diagram of an exemplary embodiment of a virtual car advisor system in use. In FIG. 2, mobile device 120 may collect data for analysis of the condition of a vehicle having body panels 210 and 220. Mobile device 120, or a component that communicates with mobile device 120, may emit energy 231 at body panel 210. Mobile device 120 may then detect the energy that is reflected off of body panel 210. Mobile device 120 may perform manipulation and/or storage of data based upon the reflected energy that is detected. For example, mobile device 120 may emit a certain wavelength of electromagnetic radiation onto body panel 210, and then detect the electromagnetic radiation that is reflected off of body panel 210. Mobile device 120 may then measure the reflected electromagnetic radiation, and store the measurement.

Mobile device 120 may perform a similar process for body panel 220. Mobile device 120 may emit energy 232 onto body panel 220, and then detect the reflected energy, measure such reflected energy, and store the measurement. Mobile device 120 may be used to collect energy reflection data on other portions of a vehicle. Once the data is collected, mobile device 120 may transmit the data to an analysis system for analysis, such as server 160, or may perform the analysis itself. Such analysis may include comparing the reflected energy measurements to determine if they are identical or sufficiently similar. If the reflected energies are not identical or sufficiently similar, the difference in reflected energies may indicate that one of the body panels has been repainted. Other analyses of reflected energy and associated measurements that may determine a condition of a vehicle are contemplated as within the scope of the present disclosure.

In another embodiment, no energy is emitted by mobile device 120 for reflection measurement, but instead mobile device 120 detects energy reflected off body panels 210 and 220 from the natural energy in the environment in which the vehicle is present. In this embodiment, the reflected energy may be measured and stored, and then analyzed to determine if repainting or other conditions are present.

Figure 3:
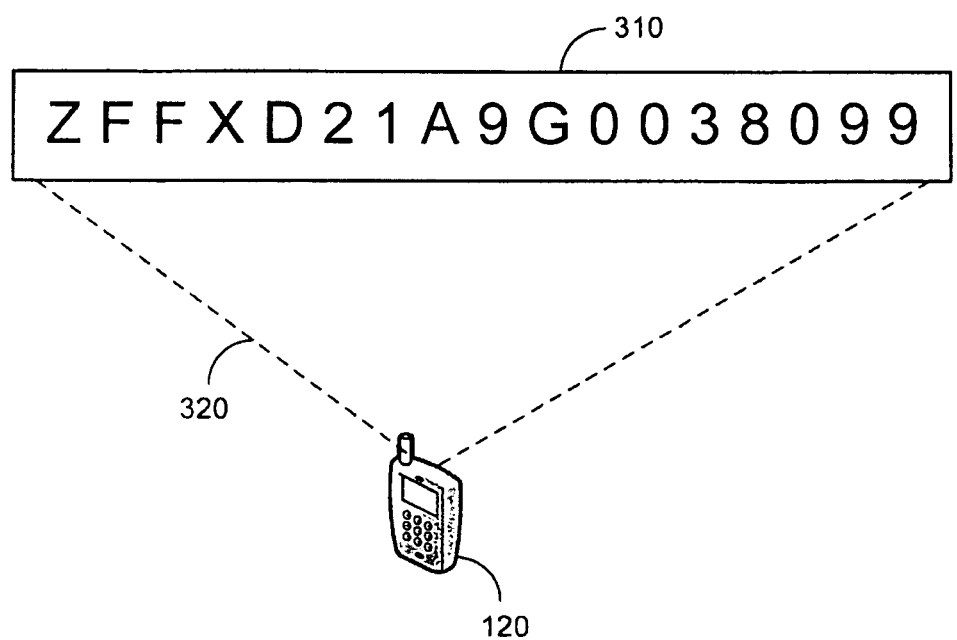
FIG. 3 is a graphical representation of an exemplary, non-limiting mobile device in use as a component in a virtual car advisor system.

In one embodiment, data may be collected with a mobile device for identification of a vehicle and/or determination of a vehicle history. In FIG. 3, a non-limiting diagram of an exemplary embodiment of a virtual car advisor system in use is illustrated. Mobile device 120 may be operated to capture an image of a section of a vehicle that may be used to determine the identity or history of the vehicle. Most cars, truck, and other vehicles manufactured in recent years have an assigned vehicle identification number ("VIN") visible on a plate attached to some portion of the vehicle. In FIG. 3, mobile device 120 may be operated to acquire image 320 of VIN plate 310. VIN plate 310 has printed or pressed on to it a copy of the VIN associated with the vehicle to which it is attached. Image 320 may be analyzed to determine the VIN using character recognition software well known to those skilled in the art. The VIN may then be used to obtain the history of the associated vehicle. Such a history may be obtained through a vehicle history database or other means available and known to those skilled in the art. This information may be useful to a prospective purchaser because it may indicate if the car is properly titled, has been stolen, or has other problems of which a purchaser may want to be aware.

Other images that may be collected and analyzed to obtain a history or identification of a vehicle are contemplated. For example, an image of the license plate of a vehicle may be acquired and analyzed to determine the rightful owner of the vehicle or the registration status of the vehicle. Alternatively, an image of a manufacturer's plate, often placed on the doorjamb of a vehicle, may be acquired. Likewise, any other code, number, identifying mark, or other insignia or indication thereof that may be present on a vehicle may be captured and analyzed to determine the vehicle's identity, history, rightful owner, registration status, make, model, year of manufacture or purchase, or any other useful information. All such images and analyses are contemplated as within the scope of the present disclosure.

Once data is collected on mobile device 120, whether the data is one or more images of vehicle sections, one or more images of identification insignia, or measurements of reflected energy, analysis may then be performed on the data. As discussed herein, such analysis may include, but is not limited to, evaluating sections or parts of the vehicle to determine if damage or repairs are present and determining an identification code from an image and then determining vehicle identity and/or history from the code.

The analysis may also include identifying the make, model, and/or year of a vehicle. This information may be used, with other information that may be included, to determine insurability of the vehicle and to generate an insurance quote for purchaser 110. This information may also be used, optionally with other data, to determine an area of further inquiry that purchaser 110 may wish to pursue. For example, if a particular make and model of vehicle manufactured in a particular year has a well known problem with its brake system, the analysis may detect this by searching relevant databases or using other means of locating such information, and report this to purchaser 110. Typical repair costs for such problems may also be reported to purchaser 110. Purchaser 110 can then check specific trouble-prone parts of vehicle 130 before purchase, or can inquire further to determine if previous or current owners have addressed such problems.

The data analyzed may also include data provided by or obtained from mobile device 120 itself, such as time, date, and location information. For example, images may be collected of sections of vehicle 130, and such images may be analyzed in conjunction with GPS coordinates associated with the image. Such coordinates may be stored with the image, along with a timestamp, to identify a location where the image was acquired and the time of acquisition. Such information may be useful for providing with the results of the analysis further information that is time or proximity sensitive.

Data collected and information derived therefrom may also be used to search vehicle sales databases or other listings of vehicles for sale, electronic or otherwise, to locate other vehicles that purchaser 110 may be interested in. Location information, such as GPS coordinates, may be used to determine the location of purchaser 110, and thereby provide listings of available vehicles that are in proximity to purchaser 110. Means and methods are well known to those skilled in the art for determining items that a user may be interested in based on the user's preferences, prior behavior, or other characteristics, and such means and methods will not be recited herein. All such means and methods are contemplated as within the scope of the present disclosure.

Referring again to FIG. 1, in one embodiment, such analysis may be performed on a remote system. In this embodiment, the collected data may be transmitted to the remote system, such as server 160, from mobile device 120, over a network or combination of networks, such as network 150. The transmission of the data may be performed when purchaser 110 operates mobile device 120 such that the transmission is initiated. Alternatively, a data collection application contained in mobile device 120 may automatically transmit data to a remote system for analysis. Means and methods of transmitting data from one device to another are well known to those skilled in the art and will not be recited herein. All such means and methods are contemplated as within the scope of the present disclosure.

Analysis of the collected data may be entirely performed automatically by one or more computers or other devices, or the analysis may be performed in whole or in part by humans. Here again, means and methods of analyzing data are well known to those skilled in the art and will not be recited herein. All such means and methods are contemplated as within the scope of the present disclosure.

In an alternative embodiment, analysis of acquired data is performed on mobile device 120. This may be accomplished through the use of one or more software applications or programs installed, configured, or otherwise operable and/or accessible on mobile device 120. Analysis on mobile device 120 may also be accomplished in conjunction with communication by mobile device 120 with other devices. Such communication may occur over a network or combination of networks such as network 150. Any analysis of data described herein, including analysis described in relation to a remote device such as server 160, may be performed on mobile device 120, and all such analysis is contemplated as within the scope of the present disclosure.

Once the collected data is analyzed, a response may be provided to purchaser 110. Such a response may be sent from car advisor system 170 through server 160, or from another device operating in cooperation with server 160 or car advisor system 170, to mobile device 120 when the analysis is performed remotely. Alternatively, when analysis is performed on mobile device 120, the response may be provided by mobile device 120 itself. Such a response may include the results of the analysis in the form of an e-mail or text message, or the response may include a link to a webpage that displays the results. Alternatively, the response may be provided through an application on mobile device 120, or it may be provided by more traditional means of communication, such as by mail or via a voice call.

The contents of the response may vary according to the system design. The contents may include, but are not limited to, detailed results of the analysis including descriptions of any problems detected, estimates of costs of repair for identified defects, recommendations as to whether to purchase vehicle 130, a history of vehicle 130, the registration status of vehicle 130, and any other information that may be of interest to purchaser 110 or any other person interested in the condition, identification, or history of a vehicle. The contents of the response may also include information not directly relating to the vehicle or its history. Such content may include insurance quotes, recommendations for repair shops, listings of other vehicles available for sale, estimates for common repairs of similar vehicles, and certain areas of inquiry which purchaser 110 may wish to pursue, such as trouble prone parts of vehicle 130. Any other content that may be of interest to a user of a car advisor system is contemplated as within the scope of the present disclosure.

Figure 4:
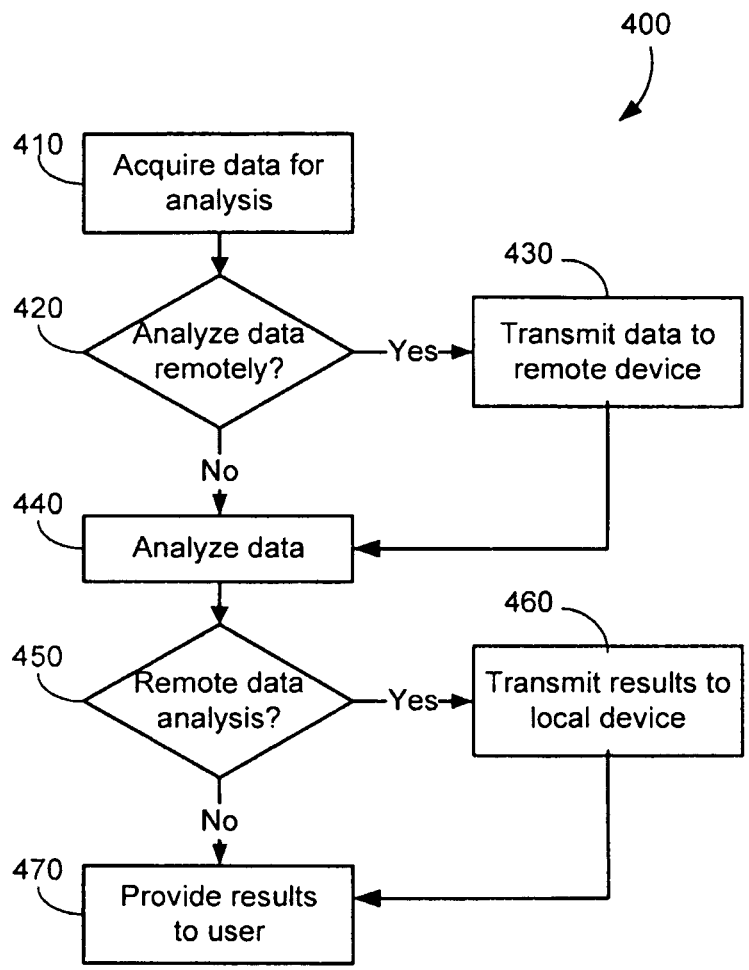
FIG. 4 is a flow diagram of an exemplary, non-limiting method of operating a virtual car advisor system.

FIG. 4 illustrates a non-limiting, exemplary method 400 of implementing the present subject matter. At block 410, data may be acquired for analysis. The data may be acquired on a mobile device operated by a user as described herein, or it may be acquired using any other effective means. On one embodiment, data is acquired using a separate device that is communicatively connected to a mobile device. Such a device may be provided to a user on an as-needed basis. For example, an insurer may provide a data collection device to an insured. This may assist the insured in obtaining information about a currently owned vehicle or a vehicle under consideration for purchase, and may assist the insurer by providing accurate and timely data to the insurer on a vehicle that the insurer may be currently insuring or may possibly insure in the future. In another example, a user may purchase a data collection device for personal use. Any means or methods of acquiring data for analysis of the condition, identification, or history of a vehicle are contemplated as within the scope of the present disclosure.

At block 420, a determination may be made as to whether the analysis is to be performed locally or remotely. If the mobile device that was used to capture the data is capable of analyzing the data, then the method progresses to block 440. Otherwise, the data may transmitted to a remote device for analysis at block 430. Transmission of the data may be accomplished using any effective means, and such means are well known to those skilled in the art and contemplated as within the scope of the present disclosure. The remote device that receives the data may be any device or multiple devices capable of analyzing the received data.

At block 440, the data is analyzed. Such analysis may include determining from images of a vehicle or sections of a vehicle whether damage or repairs have occurred to the vehicle. Such analysis may also include determining whether measured energy reflected from one or more sections of a vehicle indicate that repainting or other repairs or damage are present on the vehicle. In still another embodiment, analysis may include performing character recognition analysis or other analysis on images of identifying sections or other insignia of a vehicle, such as the VIN plate, license plate, identification plate or label, or manufacturer plate or label, to derive information associated with the vehicle. Once information is derived from an identifying section of a vehicle, such analysis may further include determining a vehicle's history, registration status, model, make, year of manufacture, or any other identification or historical information available from the derived information. Any other method or means of analyzing collected data is contemplated as within the scope of the present disclosure.

At block 450, a determination is made as to whether the analysis was performed locally or remotely. If performed locally, then the method progresses to block 470. Otherwise, the results of the analysis are transmitted to a local device at block 460. The local device may be a mobile device that gathered and transmitted collected data for analysis. Alternatively, results may be transmitted to another device accessible to the user, or the results may be transmitted to a third party device. For example, in one embodiment a first user, such as a car dealer purchasing agent, may collect data and transmit the data for analysis, and a second party, such as a car dealer purchasing manager, may receive the results of the analysis. Any other methods or means of transmitting data to a local device are contemplated as within the scope of the present disclosure.

At block 470, the results of the analysis are provided to the user. The results may be provided in any manner described herein, or in any other effective manner. The results may also include other information not directly based on the analysis, such as recommendations as to a vehicle purchase, suggestions of alternative vehicles, warnings about identified or potential problems, or any other information which may be informative for the user. The format of the results may be any effective format, and may also contain means to acquire additional information, such as hyperlinks or other inputs which may be activated to initiate further gathering of information. Any and all such means and methods of providing, formatting, and supplementing the results of an analysis are contemplated as within the scope of the present disclosure.

While example embodiments of a virtual car advisor system have been described in connection with various computing devices, the underlying concepts may be applied to and implemented, in part or whole, in any computing device or system capable of implementing a virtual car advisor system as disclosed herein. The various techniques described herein may be implemented in connection with hardware or software or, where appropriate, with a combination of both. Thus, the systems and methods for implementing a virtual car advisor, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing a virtual car advisor system. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for a virtual car advisor system may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing a virtual car advisor system. When implemented on a general-purpose processor, the program code combines with the processor to provide a unique apparatus that operates to invoke the functionality of a virtual car advisor system. Additionally, any storage techniques used in connection with a virtual car advisor system can invariably be a combination of hardware and software.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment but rather should be construed in breadth and scope in accordance with the appended claims.

What is claimed:

1. A method comprising:
receiving a request from a user via a mobile device operated by the user, the request being for assistance in evaluating a vehicle condition;
remotely controlling the user's mobile device to obtain information about a first vehicle;
receiving an image of the first vehicle from the user's mobile device;
analyzing the image to create an analysis identifying at least one characteristic of the vehicle that is indicative of the vehicle condition;
generating at least one instruction from the analysis for at least a second image to be taken;
sending a response to the user, the response comprising instructions for a second image to be taken; and
receiving the second image.

2. The method of claim 1, wherein the image is a digital photograph obtained by a camera component of the mobile device.

3. The method of claim 1, further comprising:
determining the first vehicle's make and model;
searching a vehicle database to identify a second vehicle, the second vehicle being similar to the first vehicle; and
sending information to the user about the second vehicle.

4. The method of claim 1, wherein sending the response to the user further comprises sending recommendations for further inquiries about specific aspects of the first vehicle's history.

5. The method of claim 1, wherein the response comprises a description of a problem when the problem is detected, an estimated repair cost for the problem and a recommended repair shop.

6. The method of claim 1, wherein the user is a potential purchaser of the vehicle and wherein the response comprises a recommendation as to whether to purchase the vehicle based on the vehicle condition.

7. The method of claim 1, wherein the vehicle condition comprises a different front-to-rear wheel measurement on a passenger side of the vehicle than a front-to-rear wheel measurement on a driver side of the vehicle, and wherein the detected problem comprises a problem with vehicle frame alignment.

8. The method of claim 1, wherein the vehicle condition comprises uneven tire wear and wherein a detected problem comprises misaligned wheels, and wherein the response comprises a description of the problem.

9. The method of claim 1, wherein the step of sending a response to the user is based on the analysis of the image.

10. A system comprising:
a processor; and
a memory coupled to the processor, the memory containing instructions, which when executed by the processor, cause the processor to:
receive a request from a user via a mobile device operated by the user, the request being for assistance in evaluating a vehicle condition;
remotely control the user's mobile device to obtain information about a first vehicle;
receive an image of the first vehicle from the user's mobile device;
analyze the image to create an analysis identifying at least one characteristic of the vehicle that is indicative of the vehicle condition;
generate at least one instruction from the analysis for at least a second image to be taken;
send a response to the user, the response comprising instructions for a second image to be taken; and
receive the second image.

11. The system of claim 10, wherein the image is a digital photograph obtained by a camera component of the mobile device.

12. The system of claim 10, further comprising instructions that cause the processor to:
determine the first vehicle's make and model;
search a vehicle database to identify a second vehicle, the second vehicle being similar to the first vehicle; and
send information to the user about the second vehicle.

13. The system of claim 10, wherein the instructions that send the response to the user comprise instructions that cause the processor to send recommendations for further inquiries about specific aspects of the first vehicle's history.

14. The system of claim 10, wherein the instructions that send the response to the user comprise instructions that cause the processor to:
determine the first vehicle's make and model;
determine common repairs for vehicles having the same make and model as the first vehicle; and
send information about the common repairs to the user.

15. The system of claim 10, wherein the response further comprises a description of a problem when the problem is detected, an estimated repair cost for the problem and a recommended repair shop.

16. The system of claim 10, wherein the user is a potential purchaser of the vehicle and wherein the response comprises a recommendation as to whether to purchase the vehicle based on the vehicle condition.

17. A computer-readable storage medium comprising computer-readable instructions, said computer-readable instructions comprising instructions for:
receiving a request from a user via a mobile device operated by the user, the request being for assistance in evaluating a vehicle condition, wherein the user is a potential purchaser of the vehicle;
remotely controlling the user's mobile device to obtain information about a first vehicle;
receiving an image of the first vehicle from the user's mobile device;
analyzing the image to create an analysis identifying at least one characteristic of the vehicle that is indicative of the vehicle condition;
generating at least one instruction from the analysis for at least a second image to be taken;
sending a response to the user, the response comprising instructions for a second image to be taken; and
receiving the second image.

18. The computer-readable storage medium of claim 17, wherein the image is a digital photograph obtained by a camera component of the mobile device.

19. The computer-readable storage medium of claim 17, further comprising instructions for:
determining the first vehicle's make and model;
searching a vehicle database to identify a second vehicle, the second vehicle being similar to the first vehicle; and
sending information to the user about the second vehicle.

20. The computer-readable storage medium of claim 17, wherein the instructions for sending the response to the user further comprise instructions for sending recommendations for further inquiries about specific aspects of the first vehicle's history.

21. The computer-readable storage medium of claim 17, wherein the instructions for sending the response to the user further comprise instructions for:
determining the first vehicle's make and model;
determining common repairs for vehicles having the same make and model as the first vehicle; and
sending information about the common repairs to the user.

22. The computer-readable storage medium of claim 17, wherein the response comprises a description of a problem when the problem is detected, an estimated repair cost for the problem and a recommended repair shop.

23. The computer-readable storage medium of claim 17, wherein the user is a potential purchaser of the vehicle and wherein the response comprises a recommendation as to whether to purchase the vehicle based on the vehicle condition.

* * * * *